(12) United States Patent
Clark

(10) Patent No.: US 9,913,490 B2
(45) Date of Patent: Mar. 13, 2018

(54) THIN WALL PRODUCT DISPLAY TUBE

(71) Applicant: ALTRIA CLIENT SERVICES INC., Richmond, VA (US)

(72) Inventor: James Lindsay Clark, North Chesterfield, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

(21) Appl. No.: 14/584,594

(22) Filed: Dec. 29, 2014

(65) Prior Publication Data

US 2015/0181933 A1    Jul. 2, 2015

Related U.S. Application Data

(60) Provisional application No. 61/920,986, filed on Dec. 26, 2013.

(51) Int. Cl.

| | |
|---|---|
| *B65D 85/12* | (2006.01) |
| *A24F 15/00* | (2006.01) |
| *B65D 59/02* | (2006.01) |
| *A24F 15/20* | (2006.01) |
| *B65D 5/50* | (2006.01) |
| *B65D 59/04* | (2006.01) |
| *B29L 23/14* | (2006.01) |
| *B29L 31/00* | (2006.01) |
| *B29K 23/00* | (2006.01) |

(52) U.S. Cl.
CPC .............. *A24F 15/00* (2013.01); *A24F 15/20* (2013.01); *B65D 5/5038* (2013.01); *B65D 59/02* (2013.01); *B65D 59/04* (2013.01); *B65D 85/12* (2013.01); *B29K 2023/12* (2013.01); *B29K 2223/06* (2013.01); *B29K 2623/12* (2013.01); *B29K 2823/12* (2013.01); *B29L 2023/14* (2013.01); *B29L 2031/712* (2013.01)

(58) Field of Classification Search
CPC .......... A24F 15/00; A24F 15/12; A24F 13/02; A24F 13/14; B65D 85/10; B65D 85/12
USPC ............................ 206/242, 265, 5, 305, 306
See application file for complete search history.

(56) References Cited

U.S. PATENT DOCUMENTS

| | | | |
|---|---|---|---|
| 3,346,135 A | * | 10/1967 | Haitsch .................... 215/227 |
| 3,434,614 A | | 3/1969 | Moller |
| 3,853,237 A | | 12/1974 | Marchant |
| 4,114,803 A | | 9/1978 | Romanauskas |
| 4,736,838 A | | 4/1988 | Nakata et al. |
| 4,942,965 A | * | 7/1990 | Comer ..................... 206/419 |
| 4,942,966 A | | 7/1990 | Kemp |
| 5,011,009 A | | 4/1991 | Scheurer |
| 5,667,071 A | * | 9/1997 | Nakagoshi et al. ......... 206/455 |
| D394,522 S | * | 5/1998 | Putnam ...................... D27/183 |

(Continued)

*Primary Examiner* — Steven A. Reynolds
*Assistant Examiner* — Javier A Pagan
(74) *Attorney, Agent, or Firm* — Roberts Mlotkowski Safran Cole & Calderon, P.C.

(57) ABSTRACT

A thin-walled polypropylene product display tube. The thin-walled polypropylene product display tube includes a tubular member having a closed end, an open end, an inner diameter and, between the closed end and the open end, a first outer diameter, the open end terminating in a flared portion having a second outer diameter, the tubular member having a wall thickness sufficient to yield a level of haze equal to or less than 8%. A process for forming a thin-walled polypropylene product display tube is also provided.

21 Claims, 2 Drawing Sheets

(56) References Cited

U.S. PATENT DOCUMENTS

| | | |
|---|---|---|
| 5,816,264 A | 10/1998 | Sebastiani |
| 5,957,380 A | 9/1999 | Fitterman et al. |
| 6,290,059 B1 | 9/2001 | Chuan |
| 6,382,407 B1 | 5/2002 | Chao |
| 7,959,866 B2 * | 6/2011 | Crawford et al. ............ 422/550 |
| 2011/0023895 A1 | 2/2011 | Wang |

* cited by examiner

THIN WALL PRODUCT DISPLAY TUBE

RELATED APPLICATION

This application claims priority to U.S. Provisional Application No. 61/920,986, filed on Dec. 26, 2013, the contents of which are hereby incorporated by reference in their entirety.

FIELD

Disclosed herein is a tobacco product display tube with improved clarity.

ENVIRONMENT

Cigars have been sold by others individually in glass tubes which may be sealed with stoppers. The tubes tend to somewhat resemble test tubes used for chemical samples. Such clear tubing permits the purchaser at the point-of-sale to view the contents and select the cigar which is most appealing.

It is desirable to replace glass with a material more suited for the packaging of tobacco products, such as polypropylene (PP). However heretofore, tubes constructed of PP tended to be hazy and milky in appearance, and unacceptable to a discerning, adult, tobacco consumer.

It would be advantageous if a polypropylene tobacco display tube could be developed which had enhanced clarity and appearance.

SUMMARY

In one aspect, a thin-walled polypropylene product display tube is provided. The thin-walled polypropylene product display tube includes a tubular member having a closed end, an open end, an inner diameter and, between the closed end and the open end, a first outer diameter, the open end terminating in a flared portion having a second outer diameter, the tubular member having a wall thickness sufficient to yield a level of haze equal to or less than 8%, as measured by ASTM D1003.

In one form, the inner diameter is substantially constant from a point where the closed end expands to the inner diameter to the open end of the tubular member.

In another form, the first outer diameter is substantially constant from a point where the closed end expands to the first outer diameter to a point where the flared portion begins.

In yet another form, the second outer diameter is selected to correspond to an outer diameter of a closure cap for the tubular member.

In still yet another form, the thin-walled polypropylene product display further includes a closure cap fitted to the open end, the second outer diameter of the flared portion of the tubular member mating with an outer diameter of the closure cap to form a smooth transition between the tubular member and the cap.

In a further form, the closure cap comprises a plug member for engaging against an inner surface of the open end of the tubular member and substantially forming a seal.

In a yet further form, the product is a tobacco product and the seal formed by the engagement of the plug member against the inner surface of the open end of the tubular member is sufficient to maintain product shelf life for a period of at least one year.

In a still yet further form, the tubular member has a wall thickness of less than about 0.061 inch.

In one form, the tubular member has a wall thickness of less than about 0.050 inch.

In another form, the tubular member has a wall thickness of less than about 0.030 inch.

In yet another form, the tubular member is formed from a material comprising polypropylene random copolymer, polypropylene-ethylene impact copolymer, polypropylene homopolymer, polypropylene copolymer and blends thereof.

In still yet another form, the tubular member is formed from a material comprising polypropylene random copolymer.

In another aspect, a process for forming a thin-walled polypropylene product display tube is provided. The process includes the step of forming a tubular member having a closed end, an open end, an inner diameter and, between the closed end and the open end, a first outer diameter, the open end terminating in a flared portion having a second outer diameter, wherein the forming step yields tubular member having a wall thickness sufficient to yield a level of haze equal to or less than 8%, as measured by ASTM D1003.

BRIEF DESCRIPTION OF THE DRAWINGS

The forms disclosed herein are illustrated by way of example, and not by way of limitation, in the figures of the accompanying drawings and in which like reference numerals refer to similar elements.

DETAILED DESCRIPTION

Figure 1:
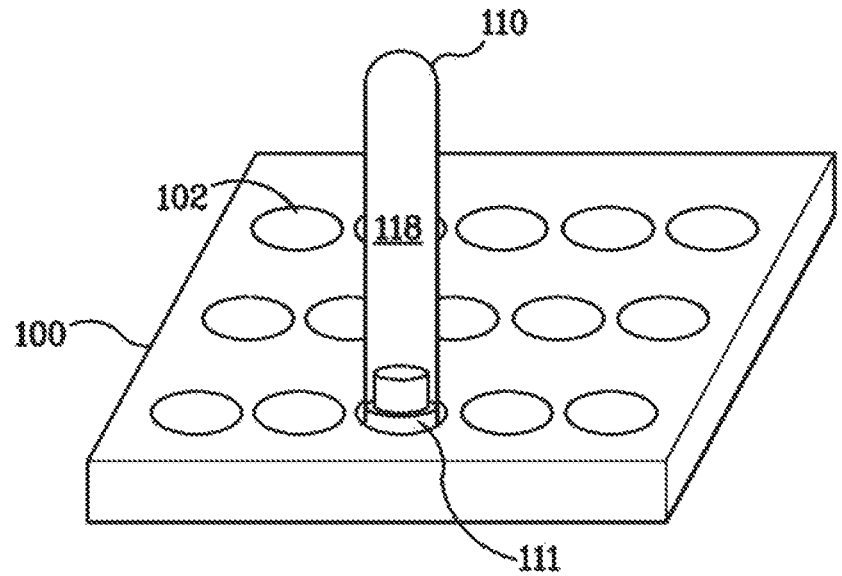
FIG. 1 is a plan view of a typical point-of-sale cigar display.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-4, wherein like numerals are used to designate like elements throughout.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

Provided is a product display apparatus, in particular a thin-walled, polypropylene tube for display of tobacco products, comprising a tubular member having a closed end, an open end, an inner diameter and, between the closed end and the open end, a first outer diameter, the open end terminating in a flared portion having a second outer diameter, the tubular member having a wall thickness sufficient to yield a level of haze equal to or less than 8%, as measured by ASTM D1003.

Resistance to moisture permeation is important in maintaining the quality of tobacco products. The moisture content of a cigar is an important factor in determining how well the cigar will smoke and realize its potential. It is well known that cigars stored in an arid environment become dry and hard and are undesirable to smoke. Dry cigars burn too rapidly and taste hot and unpleasant, and are often described as dusty and acrid. Once dry, a cigar looses most of its bouquet and cannot compare to a well-kept cigar. Conversely, a cigar smoked when too wet will not burn well and will require frequent relighting. Also, overly moist cigars taste sharp and aggressive. Therefore, for the optimum smoking experience, cigars should be kept at some intermediate ideal condition. The ideal conditions in which to keep cigars are 65 to 70 percent relative humidity and 61 to 64 degrees Fahrenheit, the most important being the relative humidity. Fine cigars are made of delicate high quality natural leaf tobacco possessing a smooth and rich flavor and should be consumed within these ideal conditions to realize the fullest enjoyment.

Cigar humidors are well known in the prior art and many cigar smokers own a tabletop model. The typical prior art humidor is a wooden box with a hinged top containing a source of moisture which is allowed to evaporate. The evaporating moisture is absorbed by the air within the humidor which in turn is absorbed by the dry cigars contained therein. The moisture source within these types of humidors can be water-absorbent stones, sponges, or plastic storage vessels. This technique of humidification is adequate for bulk cigars placed within the humidor, but is problematic for cigars sold individually within prepackaged tubes or containers because the moisture will be unable to penetrate the prepackaged container seal.

More recently, it has been found that packaging individual cigars in a moisture permeation resistant polypropylene tube permits not only a pleasing visual display of the cigar at a point-of-sale location, but also maintains the proper humidity within the display tube for periods in excess of about one year. In arid environments, adequate moisture is retained within the tube, while in a humid environment; excess moisture is excluded from the tube.

Many natural and synthetic polymers can be attacked by ultra-violet radiation and products made using these materials may crack or disintegrate, if they're not UV-stable. Over time polypropylene can discolor, becoming hazy, inhibiting the transparency or clarity. The problem is known as UV degradation, and is a common problem in products exposed to sunlight. The ultra-violet rays activate the tertiary carbon bonds to form free radicals, which then react further with oxygen in the atmosphere, producing carbonyl groups in the main chain. The exposed surfaces of such products may then discolor and crack. While not affecting tobacco product quality contained within the tube, such discoloration can negatively affect the prospective purchaser's perception of product freshness and even quality.

It has been found that a polypropylene cigar display tube can be made having thin walls such that a display tube will have a high degree of clarity and retain its clarity over time. Moreover, due to an effective seal, the product can retain its freshness, for a period in excess of at least about one year. Thus, in one form, a thin-walled polypropylene (tobacco) product display tube is provided. While cigars are discussed in connection with the display tubes disclosed herein, any similarly-sized product could be stored and displayed in such a point-of-sale tube display.

Point-of-sale product displays may be made of stiff paperboard or cardboard, and may have an array of die cut holes on at least one substantially horizontal surface for vertically holding the tobacco display tubes. The most advantageous and visually pleasing manner of displaying the cigars in the tubes is to place the tubes cap-end down within the product display, such that the clear, closed end of the display tube, and therefore the cigar within, is visually accessible to the prospective purchaser. Upon selection of a product by the purchaser, the tube is withdrawn from the product display vertically.

In one form, a thin-walled tube and an effective commercially available closure cap are employed. In the aforementioned point-of-sale product displays, any difference between the outer diameter (O.D.) of the tube and that of the cap resulting in a small ledge may impede the withdrawal of the tube from the cardboard display. During withdrawal of a cigar, the ledge may catch (snag) an edge of the die cut hole in the display box and frustrate the smooth withdrawal of the cigar. In some instances, the snag may possibly upset the entire display.

In order to remedy this difficulty, a product display tube comprising a thin-walled, cylindrical polypropylene tube having a closed end, an open end and inner and outer diameters between the ends, the open end terminating with a flared outer circumference is provided. Advantageously, the outer diameter at the flared outer circumference is predetermined to correspond and mate to the outer diameter of a closure cap for the tube. In this way, a smooth transition is provided between the outer surfaces of the thinner-walled cigar tube and the end cap, such that no ledge is created between the two, and the cigar tube can be withdrawn smoothly and evenly from a point-of-sale product display.

As shown in FIG. 1, a tobacco product display apparatus 110, such as for display of cigars at a point-of-sale location, is provided. A cardboard point-of-sale display box 100 has an array of die cut holes 102 for holding and displaying tobacco products within display tubes 110. The apparatus of FIGS. 3A and 3B takes the form of a thin-walled cylindrical polypropylene tube 110, which includes a tubular member 118, having a rounded, closed end 112 and an open end 113, similar in form to a test tube. A tobacco product, such as a cigar (not shown), is placed into the display tube 110 through the open end 113, and a closure cap 111 is placed into the open end 113 so as to seal the cigar within the display tube 110 against both the ingress and egress of moisture.

Figure 2:
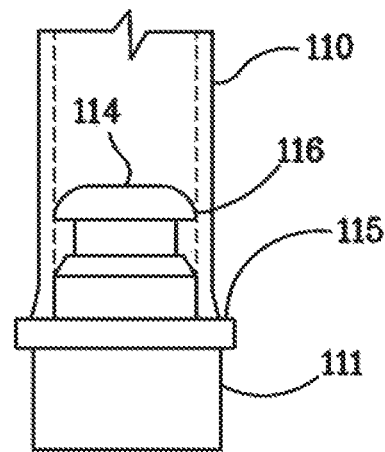
FIG. 2 is a cross-sectional view of a cigar display tube/closure cap combination, configured with a thin-walled tube.

As best seen in FIG. 2, closure cap 111 includes a plug section 114, designed to penetrate a short distance into open end 113 of display tube 110. Plug section 114 has at least one moisture sealing ring 116 formed around its circumference, such that the at least one moisture sealing ring 116 is forced into circumferential contact with the inner diameter (I.D.) of the display tube 110.

Advantageously, display tube 110 is made of polypropylene, a moisture permeation resistant polymer that is easily and inexpensively molded into the appropriate size and shape, as well as being resistant to moisture penetration, both into and out of the tube, once sealed.

It has been found that polypropylene tubes used for tobacco product containment can be optimized for clarity by reducing the wall thickness of the tubing without compromising the long term moisture permeation resistance of the tubing. Advantageously, the thin-walled polypropylene product tubes disclosed herein demonstrate long term clarity, such as retaining a level of haze equal to or less than 8%, as measured by ASTM D1003, for periods exceeding one year.

Cigar display tubes may have wall thicknesses in excess of about 0.120". The tubing outer diameter may match that of the closure caps, which is about 0.689". However, as seen in FIG. 2, when the wall thickness of the display tube 110 is reduced, a problem may occur. That problem relates to the fact that a ledge 115 may be created between the contact points of the closure cap 111 and the open end of the display tube 110.

Figure 3A:
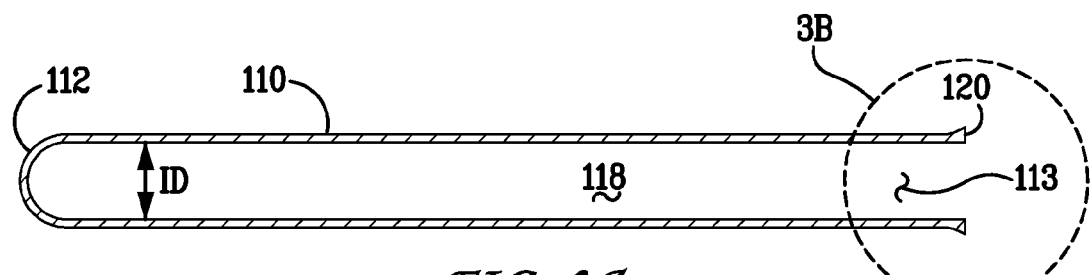
FIG. 3A is a cross-sectional view of the inventive cigar display tube.
Figure 3B:
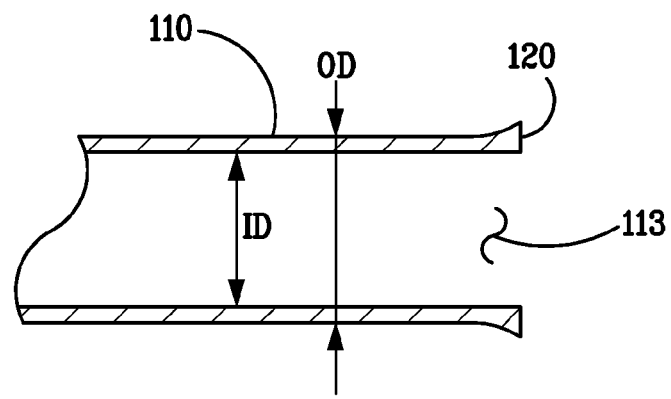
FIG. 3B is a larger, detail view of the open end of the cigar display tube of FIG. 3A.

As shown in FIGS. 3A and 3B, in order to eliminate this problem, the inner diameter of the display tube 110 is keep substantially constant from a point where the closed end 112 expands to the inner diameter to the open end 113 of the display tube 110, and the outer diameter (O.D.) is constant from a point where the closed end 112 expands to said outer diameter to a point where the flared outer circumference 120 begins.

Figure 4:
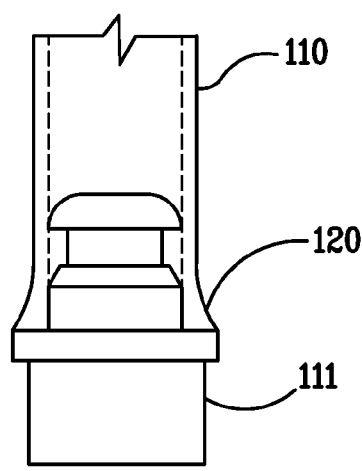
FIG. 4 is a cross-sectional view of the inventive cigar display tube/closure cap combination.

FIG. 4 illustrates how the flared outer circumference 120, at its greatest circumference, matches (essentially equals) the outer circumference of the closure cap 111, so as to form a smooth transition between display tube 110 and closure cap 111.

The overall wall thickness of the polypropylene tube between the ends can be limited to less than about 0.061", or even less than about 0.050", or even less than about 0.030", which results in improved tube clarity and product visibility for the purchaser. Even with these thinner wall diameters it has been observed that the shelf life of the tobacco product contained in the tube is in excess of about 12 months.

In one form, tubular member 118 is formed from a polypropylene material comprising polypropylene random copolymer, polypropylene-ethylene impact copolymer, polypropylene homopolymer, polypropylene copolymer and blends thereof. In another form, tubular member 118 is formed from a material comprising polypropylene random copolymer. In another form, tubular member 118 is injection molded from a high clarity polypropylene copolymer. One suitable material is Metocene RM2231 resin, available from LyondellBasell Industries, of Houston, Tex. Another is Borclear RB709CF, a random copolymer polypropylene available from Borealis Inc. of Port Murray, N.J.

In another aspect, a process for forming a thin-walled polypropylene product display tube is provided. The process includes the step of forming a tubular member having a closed end, an open end, an inner diameter and, between the closed end and the open end, a first outer diameter, the open end terminating in a flared portion having a second outer diameter, wherein the forming step yields tubular member having a wall thickness sufficient to yield a level of haze equal to or less than 8%, as measured by ASTM D1003.

Illustrative, non-exclusive examples of systems and methods according to the present disclosure have been presented. It is within the scope of the present disclosure that an individual step of a method recited herein, including in the following enumerated paragraphs, may additionally or alternatively be referred to as a "step for" performing the recited action.

INDUSTRIAL APPLICABILITY

The assemblies and processes disclosed herein are applicable to the tobacco industry, in particular that portion directed to products for smoking enjoyment.

Although many of the teachings herein are addressed to the packaging and display of cigars, the teachings are equally applicable to any other forms of tobacco product, including cigarettes, cigarillos, pipes, e-vapor products and other smoking articles in any form or shape, all of which are contemplated herein with reference to a "tobacco product."

While the present invention has been described and illustrated by reference to particular forms, those of ordinary skill in the art will appreciate that the invention lends itself to variations not necessarily illustrated herein. For this reason, then, reference should be made solely to the appended claims for purposes of determining the true scope of the present invention.

We claim:

1. A thin-walled polypropylene product display tube comprising a tubular member having a closed end, an open end, an inner diameter and, between the closed end and the open end, a first outer diameter, the open end terminating in a flared portion having a second outer diameter at a greatest circumference thereof, the tubular member having a wall thickness sufficient to yield a level of haze equal to or less than 8%, as measured by ASTM D1003, and a closure cap fitted to the open end, the greatest circumference of the flared portion mating with an outermost circumference of the closure cap to form a smooth transition with no ledge between the greatest circumference of the flared portion and the outermost circumference of the closure cap.

2. The thin-walled polypropylene product display tube of claim 1, wherein the inner diameter is substantially constant from a point where the closed end expands to the inner diameter to the open end of the tubular member.

3. The thin-walled polypropylene product display tube of claim 1, wherein the first outer diameter is substantially constant from a point where the closed end expands to the first outer diameter to a point where the flared portion begins.

4. The thin-walled polypropylene product display tube of claim 1, wherein the closure cap comprises a plug member for engaging against an inner surface of the open end of the tubular member and substantially forming a seal.

5. The thin-walled polypropylene product display tube of claim 4, wherein the product is a tobacco product and the seal formed by the engagement of the plug member against the inner surface of the open end of the tubular member is sufficient to maintain product shelf life for a period of at least one year.

6. The thin-walled polypropylene product display tube of claim 1, wherein the tubular member has a wall thickness of less than about 0.061 inch.

7. The thin-walled polypropylene product display tube of claim 6, wherein the tubular member has a wall thickness of less than about 0.050 inch.

8. The thin-walled polypropylene product display tube of claim 7, wherein the tubular member has a wall thickness of less than about 0.030 inch.

9. The thin-walled polypropylene product display tube of claim 1, wherein the tubular member is formed from a material comprising polypropylene random copolymer, polypropylene-ethylene impact copolymer, polypropylene homopolymer, polypropylene copolymer and blends thereof.

10. The thin-walled polypropylene product display tube of claim 9, wherein the tubular member is formed from a material comprising polypropylene random copolymer.

11. A process for forming a thin-walled polypropylene product display tube, the process comprising forming a tubular member having a closed end, an open end, an inner diameter and, between the closed end and the open end, a first outer diameter, the open end terminating in a flared portion having a second outer diameter at a greatest circumference thereof, wherein the forming step yields the tubular member having a wall thickness sufficient to yield a level of haze equal to or less than 8%, as measured by ASTM D1003, and providing a closure cap fitted to the open end, the greatest circumference of the flared portion mating with an outermost circumference of the closure cap to form a smooth transition with no ledge between the greatest circumference of the flared portion and the outermost circumference of the closure cap.

12. The process of claim 11, wherein the inner diameter is substantially constant from a point where the closed top end expands to the inner diameter to the open end of the tubular member.

13. The process of claim 11, wherein the first outer diameter is substantially constant from a point where the closed end expands to the first outer diameter to a point where the flared portion begins.

14. The process of claim 11, wherein the closure cap includes a plug member for engaging against an inner surface of the open end of the tubular member and substantially forming a seal.

15. The process of claim 14, wherein the product is a tobacco product and the seal formed by the engagement of the plug member against the inner surface of the open end of the tubular member is sufficient to maintain product shelf life for a period of at least one year.

16. The process of claim 11, wherein the tubular member has a wall thickness of less than about 0.061 inch.

17. The process of claim 16, wherein the tubular member has a wall thickness of less than about 0.050 inch.

18. The process of claim 17, wherein the tubular member has a wall thickness of less than about 0.030 inch.

19. The process of claim 11, wherein the tubular member is formed from a material comprising polypropylene random copolymer, polypropylene-ethylene impact copolymer, polypropylene homopolymer, polypropylene copolymer and blends thereof.

20. The process of claim 19, wherein the tubular member is formed from a material comprising polypropylene random copolymer.

21. A thin-walled polypropylene product display tube comprising a tubular member having a closed end, an open end, an inner diameter and, between the closed end and the open end, a first outer diameter, the open end terminating in a flared portion having a second outer diameter and a greatest circumference, the tubular member having a wall thickness sufficient to yield a level of haze equal to or less than 8%, as measured by ASTM D1003, and wherein the greatest circumference of the flared portion is selected to correspond to an outermost circumference of a closure cap for the tubular member such that no ledge exists between the tubular member and the closure cap.

\* \* \* \* \*